(12) United States Patent
Koyanagi et al.

(10) Patent No.: US 6,735,608 B1
(45) Date of Patent: May 11, 2004

(54) DATA INTERPOLATION METHOD

(75) Inventors: Yukio Koyanagi, jouetsu (JP); Kazuo Toraichi, Sayama (JP)

(73) Assignee: Niigata Seimitsu Co., Ltd., Niigata (JP)

( * ) Notice: Subject to any disclaimer, the term of this patent is extended or adjusted under 35 U.S.C. 154(b) by 0 days.

(21) Appl. No.: 09/719,622

(22) PCT Filed: Jun. 8, 1999

(86) PCT No.: PCT/JP99/03046
§ 371 (c)(1),
(2), (4) Date: Dec. 14, 2000

(87) PCT Pub. No.: WO99/66424
PCT Pub. Date: Dec. 23, 1999

(30) Foreign Application Priority Data

Jun. 17, 1998 (JP) .............................................. 10-86834

(51) Int. Cl.$^7$ .............................................. G06F 17/17
(52) U.S. Cl. ...................................................... 708/290
(58) Field of Search ........................................ 708/290

(56) References Cited

U.S. PATENT DOCUMENTS 3,943,346 A  *  3/1976  Urkowitz et al. ........... 708/290
5,018,090 A  *  5/1991  Shiratsuchi ................. 708/290
5,592,517 A  *  1/1997  Camp et al. ................ 375/350
6,018,597 A  *  1/2000  Maltsev et al. ............. 382/260

OTHER PUBLICATIONS

Kazuo Toraichi, Ken Mamata, "Fluency riron to wavelet kaiseki", The Journal of the Acoustical Society of Japan, May 25, 1991, vol. 47, No. 6, pp. 430–436.

Kazuo Toraichi, "Hi senkei kouzou no suuri fluency kaiseki kara no wavelet fractal chaos", Mathematical Science, Sep. 1, 1993, vol. 31, No. 9, pp. 8–12.

* cited by examiner

Primary Examiner—David H. Malzahn
(74) Attorney, Agent, or Firm—Dellett & Walters

(57) ABSTRACT

A data interpolating method capable of reducing an operation volume without the occurrence of a truncation error. Each of four step function generators generates a preset step function. Multipliers each multiply step function values output from relative step function generators by discrete data values held cyclically in data holding sections. An adding unit adds together the multiplied results output from respective multipliers in response to the respective four discrete data and the added values is integrated twice by integrators, an interpolation value between the discrete data being then output from the second-stage integrator.

9 Claims, 6 Drawing Sheets

DATA INTERPOLATION METHOD

BACKGROUND OF THE INVENTION

1. Field of the Invention

The present invention relates to a data interpolating method for interpolating a value between discrete data such as sounds or images. In this specification, it is assumed that a case where function values have finite values except zero in a local region and become zero in regions different from the region is called a "local support."

2. Description of the Prior Art

Conventionally, a method of performing data interpolation by using a sampling function is known as a data interpolation for obtaining a value between sample values that are given beforehand.

FIG. 8 is an explanatory diagram of a sampling function called a sinc function conventionally known. This sinc function is obtained when a Dirac delta function is inverse-Fourier-trans formed, and becomes one only at a sample point, where t=0, and zero at all other sample points.

FIG. 9 is an explanatory diagram of data interpolation by using the sampling function shown in FIG. 8. As shown in FIG. 9, intermediate values between each sample point are interpolated by using all the sample values.

By the way, in case where a conventional data interpolation system by using the sinc function as a sampling function, it is theoretically possible to obtain an accurate interpolation value by adding values of respective sampling functions, corresponding to sample points from $-\infty$ to $+\infty$, with convolution. Nevertheless, when the above-described interpolation operation is actually attempted with one of various types of processors, a truncation error arises due to the truncation of processing within a finite interval. Therefore, this system has a problem that sufficient accuracy cannot be obtained if the interpolation operation is performed with a small number of sample values. For example, so as to obtain 96 dB of dynamic range or S/N ratio in a sound signal, 1024 sample points should be considered, and hence, in case of using sample points less than the quantity, it is not possible to obtain sufficient sound quality. Furthermore, it is similar in consideration of image data, it is not possible to obtain sufficient image quality in case of performing interpolation processing with a small number of sample points, and the operation quantity becomes huge in case of increasing sample points, which become objects of calculation, on the contrary. Therefore, this is not practical.

BRIEF SUMMARY OF THE INVENTION

The present invention is created in consideration of these points, and an object of the present invention is to provide a data interpolating method that can reduce operation quantity and has a small error.

data interpolating method of the present invention involves a process of interpolating between discrete data in such a way as to generate a step function corresponding to plural of discrete data to make a convolution operation, and integrate a convoluted result by multiple times. More specifically, the interpolation process is made by multiplying the value of a step function generated by step function generating unit and the value of discrete data input and held cyclically in data holding unit by multiplication unit, adding the multiplied results for plural discrete data, and repeating the integral operation by multiple times. In this way, a convolution operation is performed using a step function, and the result of convolution operation can be obtained through a simple operation with sum of products, whereby the amount of operation required to get an interpolated value can be reduced.

In particular, the above-described step function is preferably obtained by differentiating a sampling function consisting of a piecewise polynomial multiple times. On the contrary, the sampling function can be obtained by integrating this step function multiple times. Therefore, the convolution operation can be equivalently performed using the step function, so that the operation contents can be simplified, and the amount of calculation can be reduced.

The above-described sampling function is preferably differentiable only once over the whole range, and has values of a local support. It is considered that it is necessary that various signals existing in the natural world have differentiability because the signals change smoothly. Nevertheless, it is considered that it is not necessary that the differentiability is not always infinite, and that it is possible to sufficiently approximate natural phenomena so long as the signals can be differentiated only once. In this manner, although there are many advantages by using a sampling function of the local support that can be differentiated finite times, conventionally, it was considered that a sampling function fulfilling these conditions did not exist. Nevertheless, by the present inventor's research, a function fulfilling the conditions described above is found.

More specifically, the above-described sampling function is a function of local support having the values other than zero in a range where the sample point t is from $-2$ to $+2$. This sampling function is defined such that:

$(-t^2-4t-4)/4$ for $-2 \leq t < -3/2$, $(3t^2+8t+5)/4$ for $-3/2 \leq t < -1$, $(5t^2+12t+7)/4$ for $-1 \leq t < -1/2$, $(-7t^2+4)/4$ for $-1/2 \leq t < 1/2$, $(5t^2-12t+7)/4$ for $1/2 \leq t < 1$, $(3t^2-8t+5)/4$ for $1 \leq t < 3/2$, and $(-t^2+4t-4)/4$ for $3/2 \leq t \leq 2$ Or a step function corresponding to such a sampling function may consist of eight piecewise sections in equal width with a weight of $-1$, $+3$, $+5$, $-7$, $-7$, $+5$, $+3$, and $-1$ in a predetermined range corresponding to five discrete values of data arranged at an equal interval.

In this way, since the interpolation process is performed using a sampling function differentiable only once over the whole range, the number of integrating the result of convolution operation using a step function can be decreased, and the amount of calculation can be reduced. Also, because of the use of a sampling function having values of a local support, it is possible to handle only discrete data corresponding to a section for the local support, so that the amount of calculation can be further reduced. Moreover, it is possible to prevent the truncation error from arising when the interpolation process is performed for the finite number of discrete data.

DETAILED DESCRIPTION OF THE PREFERRED EMBODIMENT

Figure 1:
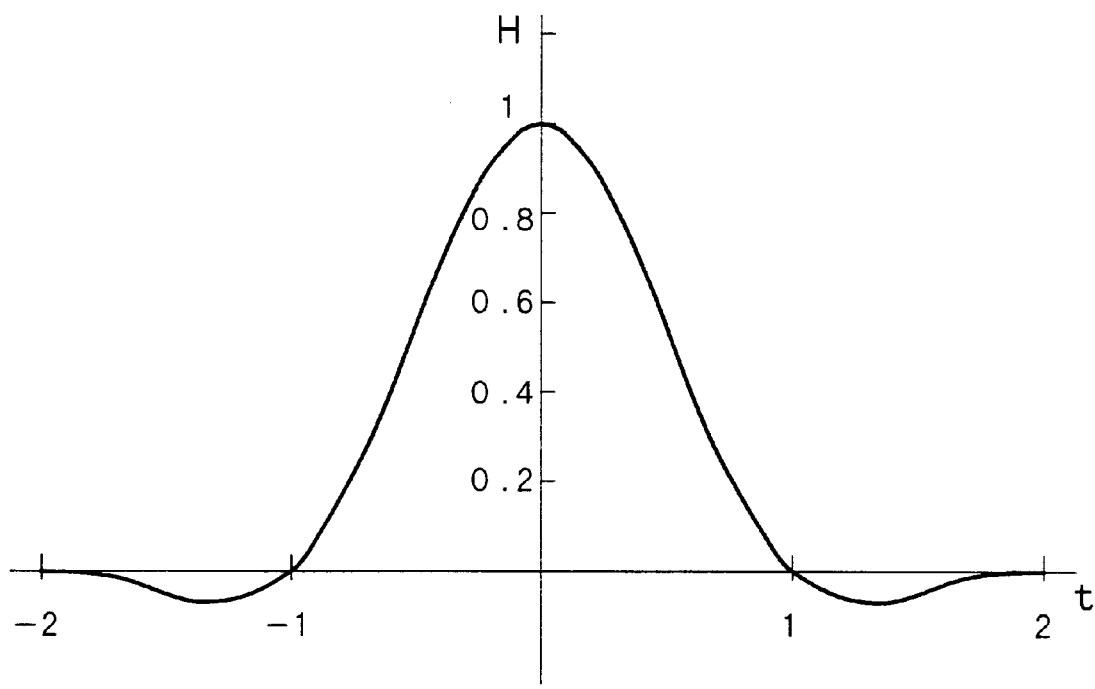
FIG. 1 is an explanatory graph of a sampling function applied in a data processor according to an embodiment.

A data processor to which a data interpolating method is applied according to one embodiment of the present invention will be described below with reference to the drawings. FIG. 1 is a graph for explaining a sampling function for use with an interpolation operation in the data processor of this embodiment. A sampling function H(t) shown in FIG. 1 is a function of a local support to which attention is paid on differentiability. For example, the function H(t) can be differentiated only once in the whole region and a function of a local support having finite values, which are not zeroes, when a sample point t along a horizontal axis is between $-2$ and $+2$. In addition, since being a sampling function, the function H(t) is characterized in that the function H(t) becomes one only at a sample point with t=0 and becomes zero at sample points with t=±1 and ±2.

It is verified by the present inventor's investigation that a function H(t) fulfilling various conditions described above (a sampling function, one-time differentiability, and a local support) exists. Concretely, with letting a third order B spline function be F(t), such a sampling function H(t) can be defined as:

$$H(t)=-F(t+1/2)/4+F(t)-F(t-1/2)/4 \quad (1)$$

where F(t) is a third order B spline function. Here, the third order B spline function F(t) is expressed as:

$$(4t^2+12t+9)/4; \quad -3/2 \geq t < -1/2$$
$$-2t^2+3/2; \quad -1/2 \leq t < 1/2$$
$$(4t^2-12t+9)/4; \quad 1/2 \leq t < 3/2 \quad (2)$$

The above-described sampling function H(t) is a quadric piecewise polynomial, and uses the third order B spline function F(t). Therefore, the function H(t) is a function of a local support that is guaranteed to be differentiable only once over the whole region. In addition, the function H(t) becomes zero at t=±1 and +2.

Substituting the expression (2) into (1), the sampling function H(t) is represented in the form of a piecewise polynomial such that:

$$(-t^2-4t-4)/4; \quad -2 \leq t < -3/2$$
$$(3t^2+8t+5)/4; \quad -3/2 \leq t < -1$$
$$(5t^2+12t+7)/4; \quad -1 \leq t < -1/2$$
$$(-7t^2+4)/4; \quad -1/2 \leq t < 1/2$$
$$(5t^2-12t+7)/4; \quad 1/2 \leq t < 1$$
$$(3t^2-8t+5)/4; \quad 1 \leq t < 3/2$$
$$(-t^2+4t-4)/4; \quad 3/2 \leq t \leq 2 \quad (3)$$

In this manner, the above-described function H(t) is a sampling function and a function of a local support that can be differentiated only once over the whole region and converges to zero at sample point t=±2. Therefore, it is possible to perform interpolation of a value between sample value using a function, which is differentiable only once, by performing convolution on the basis of respective sample value using this sampling function H(t).

Figure 2:
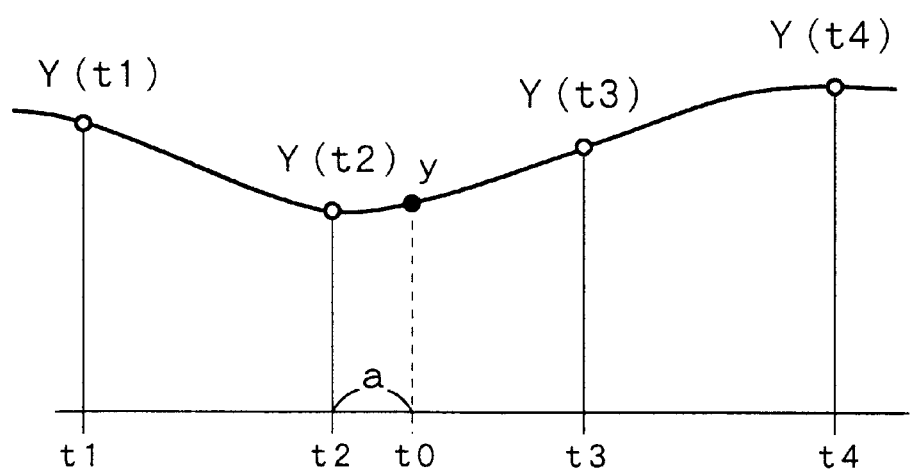
FIG. 2 is a graph showing a relation of the sampled values with an interpolated value between them.

FIG. 2 shows the relationship between sample value and interpolation values between the sample values. Generally, to obtain an interpolation value y corresponding to intermediate position between each sample value, the value of a sampling function is obtained for each piece of the given sampling value at the position of the interpolation value, and a convolution operation is performed using the obtained value.

In order to obtain the interpolation value y accurately, since the sinc function conventionally used converges to zero at sample points t=±∞, it is necessary to calculate a value of the sinc function at a position of the interpolation value according to each sample value between t=±∞ and performing convolution operation using these values. Nevertheless, since the sampling function H(t) used in this embodiment converges to zero at sample points with t=±2, it is sufficient to consider each two sample values before and after a sample point. Therefore, it is possible to drastically reduce operation quantity. In addition, since it is theoretically unnecessary to consider sample value except that without disregarding the sample value in consideration of operation quantity, accuracy, and the like although the sampling value should be considered, no truncation error arises.

FIGS. 3A to 3D are graphs for explaining the data interpolation using the sampling function shown in FIG. 1. Hereinafter, for examples, the sample value Y(t1) at the sample position t1 shown in FIG. 3A will be described concretely. The distance from an interpolation position t0 to a sampling position t1 becomes equal to 1+a, when the distance between two adjacent sampling positions is normalized at 1. Accordingly, when the central position of the sampling function H(t) is aligned to the sampling position t1, the value of the sampling function at interpolation position t0 becomes equal to H(1+a). Practically, since the peak height of the center position of the sampling function H(t) is adjusted so that the peak height may coincide with the sample value Y(t1), a value to be obtained becomes a value H(1+a)·Y(t1) obtained by multiplying the above-described function value H(1+a) by Y(t1).

Figure 3:
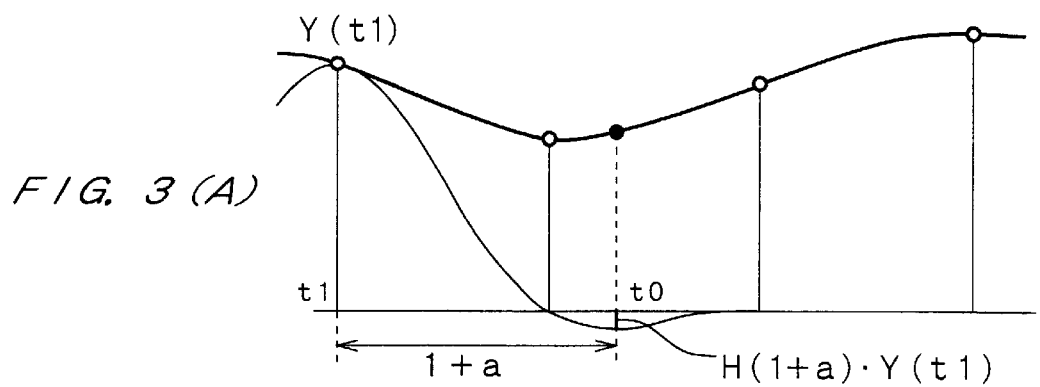
FIGS. 3A to 3D are graphs for explaining the data interpolation using the sampling function shown in FIG. 1.
Figure 3:
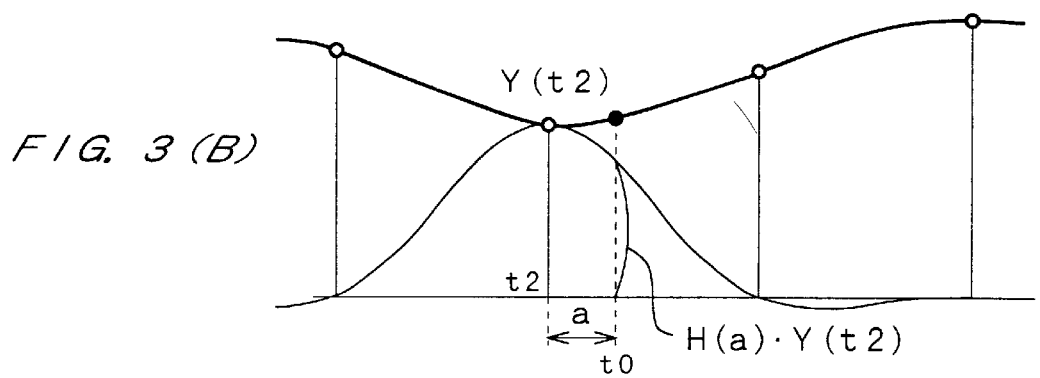
Figure 3:
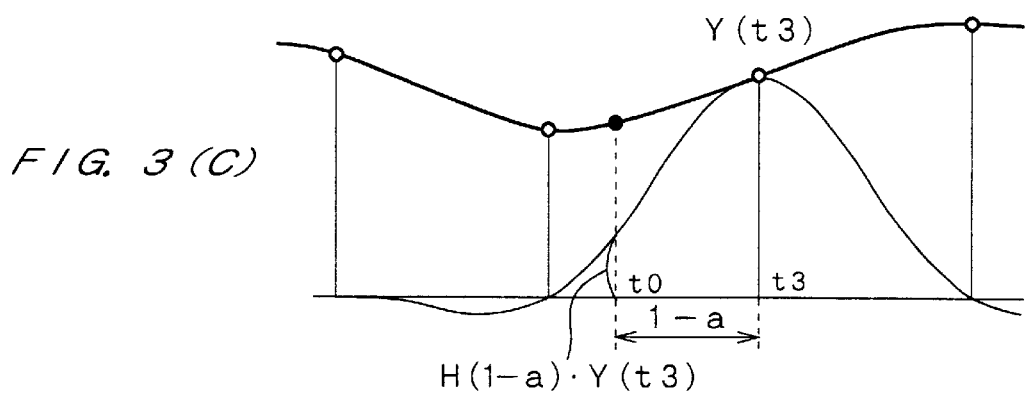
Figure 3:
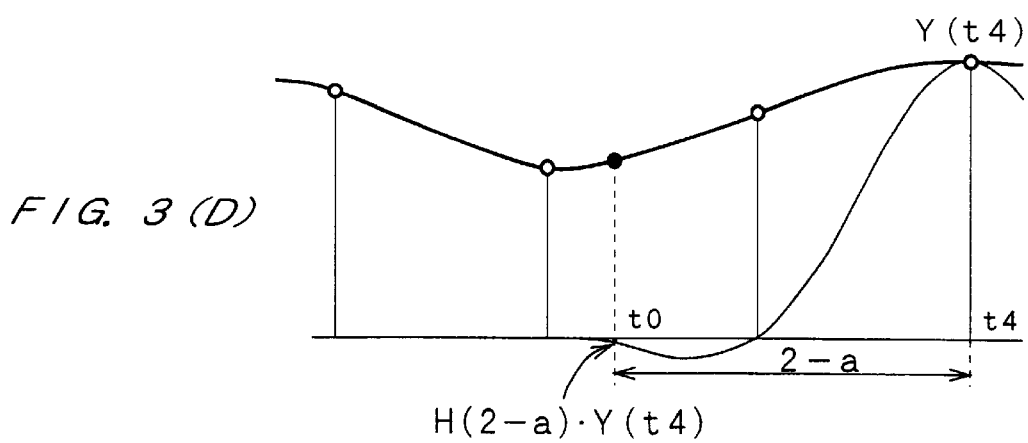

In the same way, the calculated results H(a)·Y(t2), H(1−a)·Y(t3), and H(2−a)·Y(t4) corresponding to other three sample values are obtained at interpolation position t0, as shown in FIGS. 3B to 3D. Then, four calculated results H(1+a)·Y(t1), H(a)·Y(t2), H(1−a)·Y(t3), and H(2−a)·Y(t4) are added, and convoluted to get an interpolated value y at interpolation position t0.

In principle, the value of the sampling function H(t) is calculated in correspondence to each sample value, and convoluted, so that an interpolated value corresponding to an intermediate position between the sample values can be obtained, as described above. However, the sampling function of FIG. 1 is a quadratic piecewise polynomial that is differentiable once over the whole region. Using this feature, the interpolated value can be obtained in accordance with other equivalent processing procedures.

Figure 4:
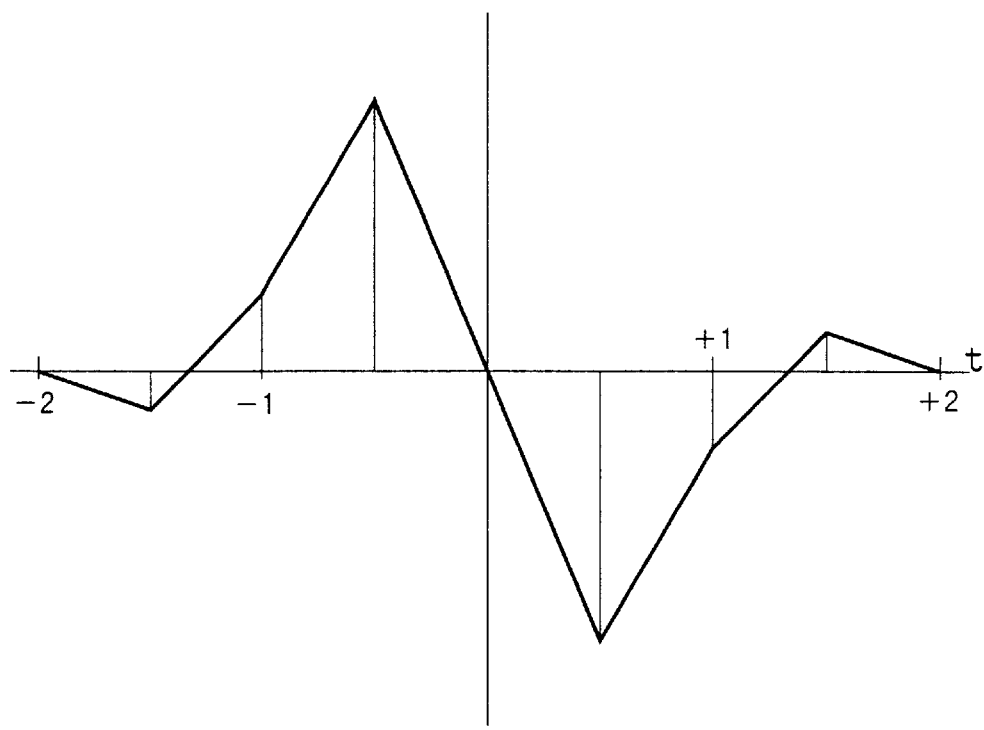
FIG. 4 is a graph showing a waveform in which the sampling function shown in FIG. 1 is differentiated once.

FIG. 4 is a graph representing a waveform where the sampling function of FIG. 1 is differentiated once. Since the sampling function H(t) of FIG. 1 is a quadratic piecewise polynomial that is differentiable only once over the whole region, a polygonal function consisting of continuous polygonal waveforms as shown in FIG. 4 can be obtained by differentiating the sampling function H(t) once.

Figure 5:
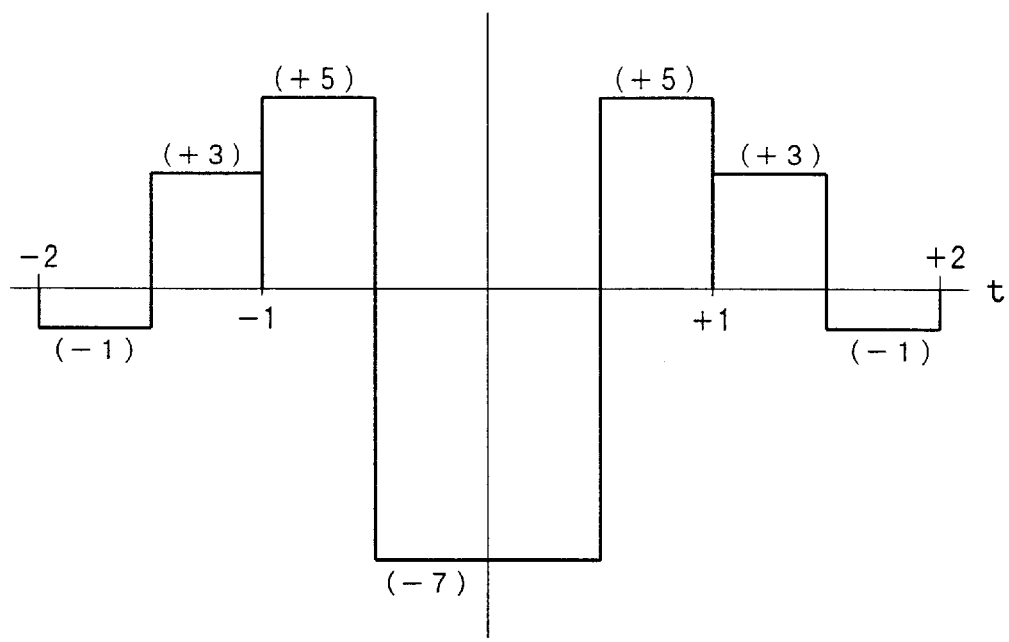
FIG. 5 is a graph showing a waveform in which a polygonal function shown in FIG. 4 is further differentiated.

FIG. 5 is a graph representing a waveform where the polygonal function of FIG. 4 is further differentiated. However, the polygonal waveform, containing a plurality of corner points, can not be differentiated over the entire region, and is differentiated for a linear section between two adjacent corner points. By differentiating the polygonal waveform shown in FIG. 4, a step function consisting of staircase waveforms can be obtained, as shown in FIG. 5.

The step function as shown in FIG. 5 has a feature of having an equal area in the positive region and the negative region, in which the sum of area is zero. In other words, if the step function having such feature is integrated by multiple times, a sampling function of a local support that is assured to be differentiable over the entire region can be obtained, as shown in FIG. 1.

In this way, the sampling function for use with the interpolation operation in the data processor of this embodiment is differentiated once over the whole region to get a polygonal function. Further, this polygonal function is differentiated over each linear section to get a step function. Accordingly, in reverse order, the step function of FIG. 5 is generated and integrated twice, so that a sampling function H(t) of FIG. 1 can be obtained.

By the way, in calculating the interpolated value by the use of convolution operation shown in FIGS. 3A to 3D, the value of the sampling function H(t) is multiplied by each sample value. However, in the case where the step function as shown in FIG. 5 is integrated twice to get a sampling function H(t), the value of the sampling function obtained by this integration is multiplied by each sample value, but equivalently, the step function prior to integration may be multiplied by each sample value.

Instead of summing the products of the value of the sampling function calculated corresponding to each of four sample values and the sample value, it is also possible that the results of multiplying the value of the step function and the sample value are summed, and the summation is integrated twice to get an interpolated value. The data processor of this embodiment calculates the interpolated value in this manner, and will be detailed below.

Figure 6:
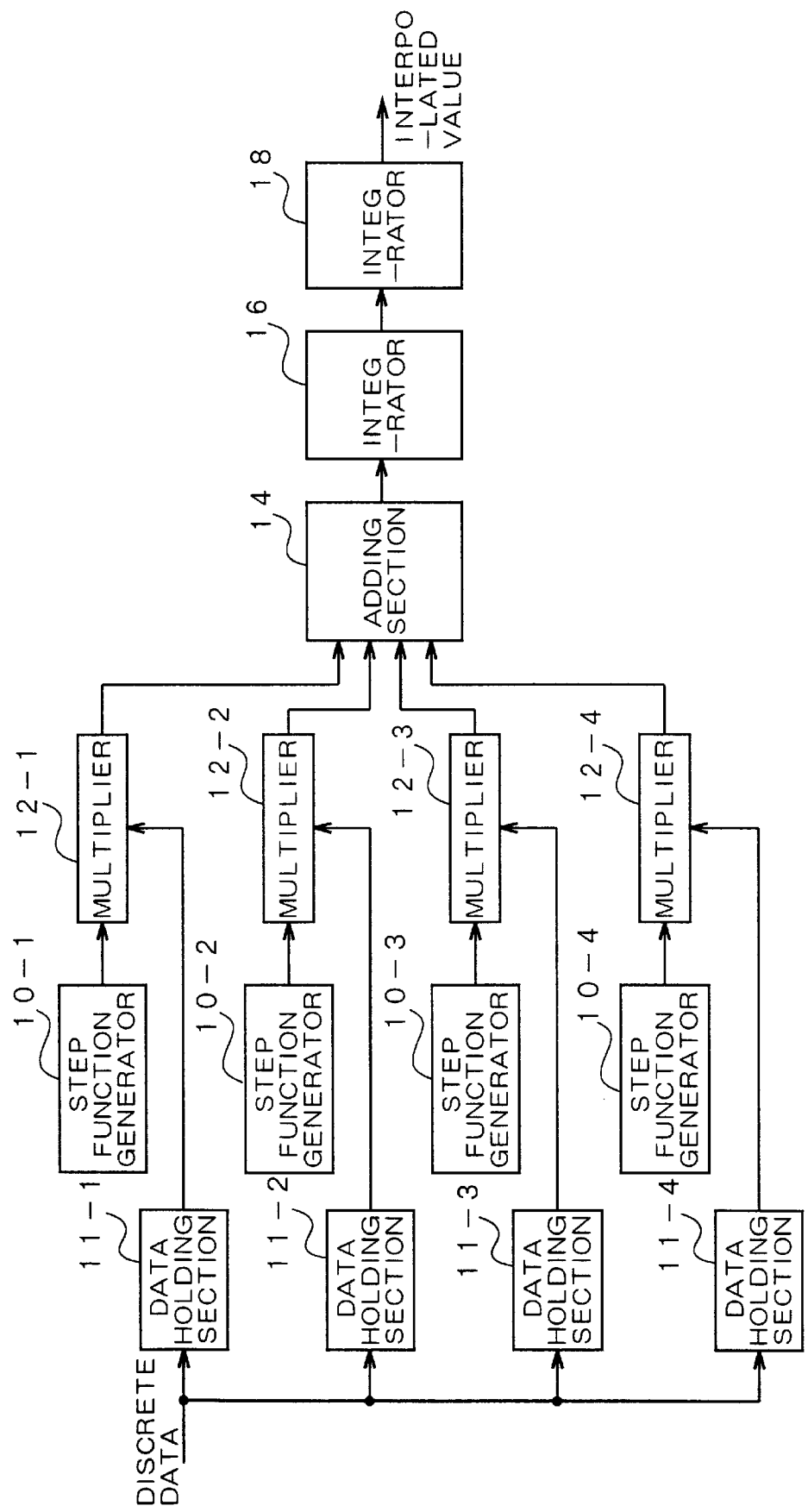
FIG. 6 is a block diagram showing the configuration of a data processor of an embodiment.

FIG. 6 is a diagram showing a configuration of the data processor of this embodiment. The data processor of this embodiment shown in FIG. 6 performs an interpolation process on the basis of input discrete data in a manner to smoothly connect discrete data, when the discrete data corresponding to the sample value is input at a constant interval, and comprises four step function generators 10-1, 10-2, 10-3, 10-4, four data holding sections 11-1, 11-2, 11-3, 11-4, four multipliers 12-1, 12-2, 12-3, 12-4, an adding section 14, and two integrators 16, 18. The above data holding sections 11-1 to 11-4 correspond to data holding unit; the step function generators 10-1 to 10-4 correspond to step function generating unit; the multipliers 12-1 to 12-4 correspond to multiplying unit; the adding section 14 corresponds to adding unit; and the integrators 16, 18 correspond to integrating unit.

Each of the step function generators 10-1 to 10-4 generates a step function shown in FIG. 5 repetitively at a timing synchronized with the timing of discrete data input successively. Specific values of the step function can be acquired by differentiating each piecewise polynomial of the above expression (3) twice and represented as follows.

$-1; \; -2 \leq t < -3/2$ $3; \; -3/2 \leq t < -1$ $5; \; -1 \leq t < -1/2$ $-7; \; -1/2 \leq t < 0$ $-7; \; 0 \leq t < 1/2$ $5; \; 1/2 \leq t < 1$ $3; \; 1 \leq t < 3/2$ $-1; \; 3/2 \leq t \leq 2$ Each of the data holding sections 11-1 to 11-4 selects and accepts cyclically the discrete data input successively and holds its value till the next accept timing arrives. For example, the discrete data input at first is held in a data holding section 11-1; the discrete data input secondly is held in a data holding section 11-2; the discrete data input thirdly is held in a data holding section 11-3; and the discrete data input fourthly is held in a data holding section 11-4. If the holding operation of data in each of the data holding sections 11-1 to 11-4 is circulated, the fifth discrete data input subsequently is accepted and held in the data holding section 11-1 that has a longest data holding time. In this way, the discrete data input successively is held cyclically in the data holding sections 11-1 to 11-4.

Each of the multipliers 12-1 to 12-4 multiplies the value of the step function at a time when it is output from a corresponding one of the step function generators 10-1 to 10-4 and the value of the discrete data held in a corresponding one of the data holding sections 11-1 to 11-4. The adding section 14 adds up the multiplied results of four multipliers 12-1 to 12-4. Two integrators 16, 18 connected in tandem perform two integral operations for the stepwise changing output values that are output from the adding section 14. A linearly changing (like a linear function) output value is obtained from a former integrator 16, and an output value changing like a quadratic function is obtained from a latter integrator 18. In this way, the value obtained from the latter integrator 18 becomes an interpolated value corresponding to an intermediate position between each discrete data.

In the above configuration, for example, a step function output from a step function generator 10-1 is integrated twice by two integrators 16, 18 to get a sampling function shown in FIG. 1. Also, the step function output from the step function generator 10-1 is multiplied by the value of discrete data held in a data holding section 11-1, so that a multiplied value of the value of the sampling function and the value of discrete data held in the data holding section 11-1 is output from the latter integrator 18.

Accordingly, considering the case where the discrete data is input at a constant time interval, the start timing of generating the step function in each of the step function generators 10-1 to 10-4 is shifted corresponding to the input interval. Then, the value of the step function generated in each of the step function generators 10-1 to 10-4 and the value of discrete data held in each of the data holding sections 11-1 to 11-4 are multiplied and added, and the thus-obtained result is integrated twice to get an interpolated value between discrete data.

Figure 7:
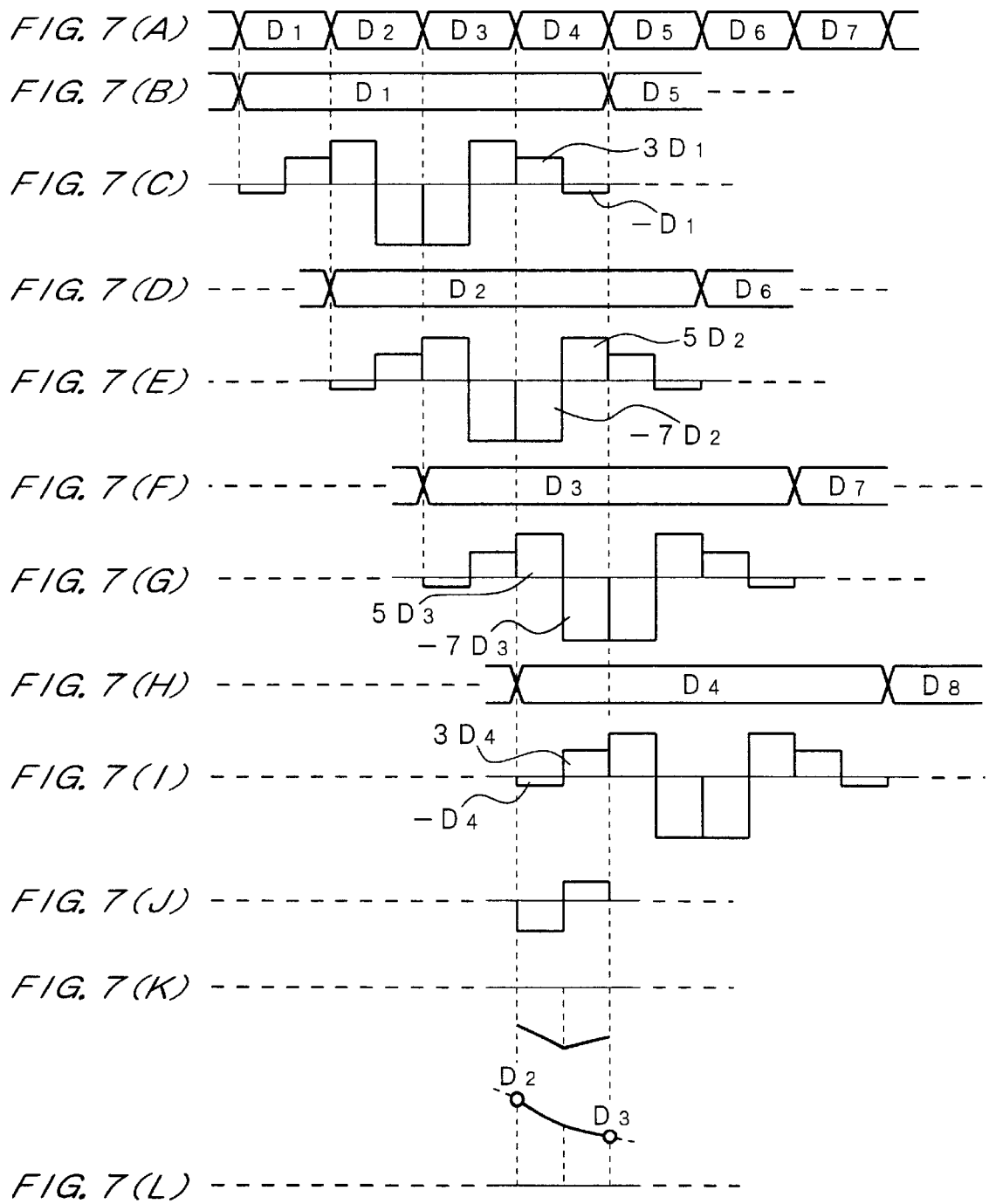
FIGS. 7A to 7L are charts showing the operation timings of the data processor of an embodiment.
Figure 8:
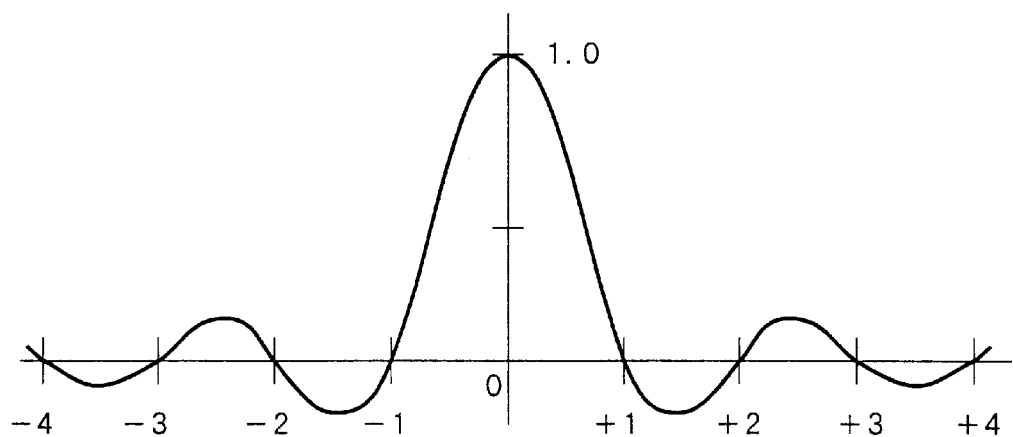
FIG. 8 is an explanatory graph of a sinc function.
Figure 9:
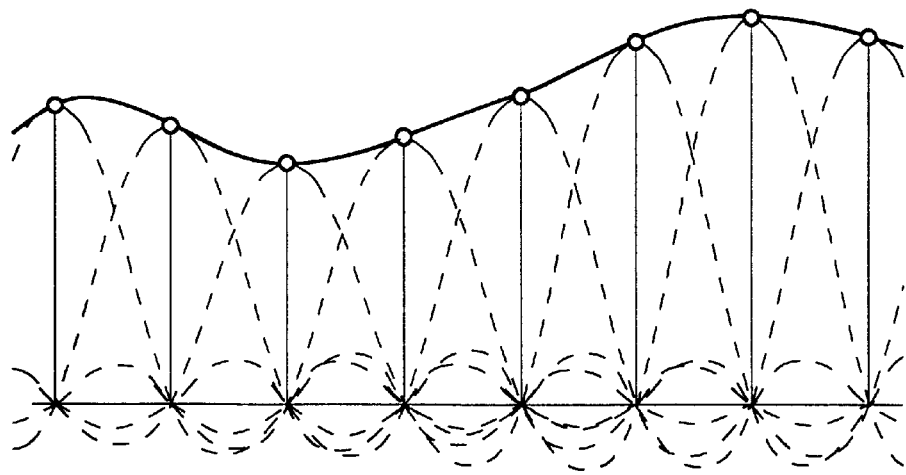
FIG. 9 is an explanatory graph of data interpolation using the sinc function.

FIGS. 7A to 7L are charts showing the operation timings of the data processor in this embodiment. As shown in FIG. 7A, if the discrete data $D_1, D_2, D_3, \ldots$ is input at a constant time interval, each of the data holding sections 11-1 to 11-4 holds cyclically the discrete data $D_1$, $D_2$, $D_3$, .... More specifically, the data holding section 11-1 accepts the discrete data $D_1$ input at first, and holds the discrete data $D_1$ till the input discrete data is circulated (or till the fifth discrete data $D_5$ is input) (FIG. 7B). The step function generator 10-1 generates a step function as shown in FIG. 5 in accordance with the hold timing of the first discrete data $D_1$. A multiplier 12-1 multiplies the value of the step function generated by the step function generator 10-1 and the value of the discrete data $D_1$ held in the data holding section 11-1 to output a multiplied result that changes stepwise (FIG. 7C).

Similarly, a data holding section 11-2 accepts the discrete data $D_2$ input secondly and holds the discrete data $D_2$ till the input discrete data is circulated (or till the sixth discrete data $D_6$ is input) (FIG. 7D). A step function generator 10-2 generates a step function as shown in FIG. 5 in accordance with the hold timing of the second discrete data $D_2$. A multiplier 12-2 multiplies the value of the step function generated by the step function generator 10-2 and the value of the discrete data $D_2$ held in the data holding section 11-2 to output a multiplied result that changes stepwise (FIG. 7E).

A data holding section 11-3 accepts the discrete data $D_3$ input thirdly and holds the discrete data $D_3$ till the input discrete data is circulated (or till the seventh discrete data $D_7$ is input) (FIG. 7F). A step function generator 10-3 generates a step function as shown in FIG. 5 in accordance with the hold timing of the third discrete data $D_3$. A multiplier 12-3 multiplies the value of the step function generated by the step function generator 10-3 and the value of the discrete data $D_3$ held in the data holding section 11-3 to output a multiplied result that changes stepwise (FIG. 7G).

A data holding section 11-4 accepts the discrete data $D_4$ input fourthly and holds the discrete data $D_4$ till the input discrete data is circulated (or till the eighth discrete data $D_8$ is input) (FIG. 7H). A step function generator 10-4 generates a step function as shown in FIG. 5 in accordance with the hold timing of the fourth discrete data $D_4$. A multiplier 12-4 multiplies the value of the step function generated by the step function generator 10-4 and the value of the discrete data $D_4$ held in the data holding section 11-4 to output a multiplied result that changes stepwise (FIG. 7I).

The adding section 14 adds up the multiplied results output from four multipliers 12-1 to 12-4 in this way (FIG. 7J). Since the value of the step function and the value of each discrete data are multiplied and then added, the result of addition becomes a simple step function.

By the way, the step function generated by each of the step function generators 10-1 to 10-4 as shown in FIG. 5 is a function of a local support having eight piecewise sections, which are divided at every 0.5 from a region of the sample point t from $-2$ to $+2$ in which the region of local support of the sampling function shown in FIG. 1. For example, the first piecewise section, the second piecewise section, ..., and the eighth piecewise section are arranged in a direction from the sample point $t=-2$ to $+2$.

More specifically, the adding section 14 first adds a multiplied result ($3D_1$) corresponding to the seventh piecewise section that is output from the multiplier 12-1, a multiplied result ($-7D_2$) corresponding to the fifth piecewise section that is output from the multiplier 12-2, a multiplied result ($5D_3$) corresponding to the third piecewise section that is output from the multiplier 12-3, and a multiplied result ($-D_4$) corresponding to the first piecewise section that is output from the multiplier 12-4 to output a result of addition ($3D_1-7D_2+5D_3-D_4$).

Subsequently, the adding section 14 adds a multiplied result ($-D_1$) corresponding to the eighth piecewise section that is output from the multiplier 12-1, a multiplied result ($5D_2$) corresponding to the sixth piecewise section that is output from the multiplier 12-2, a multiplied result ($-7D_3$) corresponding to the fourth piecewise section that is output from the multiplier 12-3, and a multiplied result ($3D_4$) corresponding to the second piecewise section that is output from the multiplier 12-4 to output a result of addition ($-D_1+5D_2-7D_3+3D_4$).

If the stepwise summation is output successively from the adding section 14, the former integrator 16 integrates the summation to output a polygonal waveform (FIG. 7K). The latter integrator 18 further integrates the polygonal waveform to output a waveform of a smooth curve differentiable only once connecting between the discrete data $D_2$ and $D_3$ (FIG. 7L).

In this way, the data processor of this embodiment generates a step function in accordance with the input timing of discrete data, multiplies the value of the step function and the value of discrete data, adds up the multiplied results for four discrete data, and integrates a result of addition twice to get an interpolated value between discrete data. Since four discrete data is only necessary to be considered to get the interpolated value, the reduced amount of calculation and the simplified device constitution can be effected. Since the value of the step function and the value of discrete data are multiplied and then added, it is required to take one sum of products in every section where the step function does not change in value to acquire an output value of the adding section 14. Therefore, the amount of calculation required for the interpolation process can be reduced significantly.

Two integrators 16, 18 to integrate twice a step function waveform to be input can be implemented by an analog integration circuit. In this case, it is possible to have a continuous analog waveform connecting between each discrete data, whereby a digital-to-analog converter can be materialized with a simple constitution. Particularly, the digital-to-analog converter materialized in this way can supply an analog value for correctly interpolating between discrete data without the oversampling process. Hence, there is no need of fast signal processing, using expensive parts, and a low-pass filter at the last stage that was necessary for the conventional digital-to-analog converter, whereby the linear phase characteristic can be implemented.

The present invention is not limited to the above-described embodiments, but may be modified in various ways within the scope or spirit of the invention. For example, in the embodiments described above, the sampling function is a function of a local support differentiable only once over the whole region, but the sampling function may be differentiable twice or more times. Also, the sampling function of this embodiment converges to zero at $t=\pm2$, as shown in FIG. 1, but may converge to zero at $t=\pm3$ or beyond. For example, in a case of the sampling function converging to zero at $t=\pm3$, six step function generators, six multipliers, and six data holding sections may be contained in the data processor as shown in FIG. 6, to perform an interpolation process for six discrete data.

Using a sampling function differentiable finite times having values over the range from $-\infty$ to $+\infty$, rather than a sampling function of a local support, an interpolation process may be performed only for plural discrete data corresponding to finite sample points. For example, if such a sampling function is defined by a quadratic piecewise polynomial, the step function can be obtained by differentiating each piece wise polynomial twice. A convolution operation is performed using this step function, and a convoluted result is integrated twice to get an interpolated value corresponding to an intermediate position between the discrete data.

INDUSTRIAL APPLICABILITY

As described above, with the present invention, the convolution operation is performed using a step function, and a result of convolution operation obtained by a simple operation of sum of products is further integrated to get an interpolated value between discrete data, whereby the amount of calculation required to obtain the interpolated value can be reduced.

What is claimed is:

1. A data interpolating method for interpolating between plural discrete data, said plural discrete data comprising sound or images data, the method comprising:

convoluting said plural discrete data using a predetermined step function to produce a convoluted result, and integrating said convoluted result multiple times to interpolate between the plural discrete data, wherein said method is performed by a computer.

2. A data interpolating method comprising:

employing a plurality of data holding units for holding cyclically each of plural discrete data to be input at a predetermined interval in due order;

employing a plurality of step function generating units for generating a step function at a predetermined timing corresponding to the timing of holding said discrete data in the plurality of said data holding units;

employing a plurality of multiplying units for multiplying a value of said step function generated by each of said step function generating units and a value of said discrete data held in said data holding units corresponding to each of said data holding units;

employing an adding unit for adding up the multiplied results; and employing an integrating unit for integrating a summation obtained by addition with said adding unit multiple times.

3. The data interpolating method according to claim 2, wherein said step function comprises a positive region and a negative region set to have an equal area.

4. The data interpolating method according to claim 2, wherein said step function is obtained by differentiating each of piecewise polynomials multiple times, when a sampling function is configured by said piecewise polynomials.

5. The data interpolating method according to claim 4, wherein said sampling function is differentiable only once over the whole region and has values of a local support.

6. The data interpolating method according to claim 5, wherein two integration operations are performed, and a quadratic piecewise polynomial is used to interpolate between said plural discrete data.

7. A The data interpolating method according to claim 5, wherein said sampling function is a function of local support having values other than zero in a range where the sample point t is from −2 to +2, and said sampling function is defined such that:

$(-t^2-4t-4)/4$ for $-2 \leq t < -3/2$, $(3t^2+8t+5)/4$ for $-3/2 \leq t < -1$, $(5t^2+12t+7)/4$ for $-1 \leq t < -1/2$, $(-7t^2+4)/4$ for $-1/2 \leq t < 1/2$, $(5t^2-12t+7)/4$ for $1/2 \leq t < 1$, $(3t^2-8t+5)/4$ for $1 \leq t < 3/2$, and $(-t^2 4 30t-4)/4$ for $3/2 \leq t \leq 2$.

8. The data interpolating method according to claim 7, wherein two integration operations are performed, and a quadratic piecewise polynomial is used to interpolate between said plural discrete data.

9. The data interpolating method according to claim 2, wherein said step function consists of eight piecewise sections in equal width with a weight of −1, +3, +5, −7, −7, +5, +3, and −1 in a predetermined range corresponding to five discrete data arranged at an equal interval.

* * * * *